US007130725B2

(12) United States Patent
Burner et al.

(10) Patent No.: US 7,130,725 B2
(45) Date of Patent: Oct. 31, 2006

(54) METHOD FOR CORRECTING CONTROL SURFACE ANGLE MEASUREMENTS IN SINGLE VIEWPOINT PHOTOGRAMMETRY

(75) Inventors: Alpheus W. Burner, Hayes, VA (US); Danny A. Barrows, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/239,457

(22) Filed: Sep. 20, 2005

(65) Prior Publication Data

US 2006/0136102 A1 Jun. 22, 2006

Related U.S. Application Data

(60) Provisional application No. 60/637,517, filed on Dec. 17, 2004.

(51) Int. Cl.
G01C 23/00 (2006.01)
B64C 3/38 (2006.01)
(52) U.S. Cl. ............................................. 701/3; 244/47
(58) Field of Classification Search .................... 701/3, 701/4, 7, 8, 10; 348/148; 244/47, 99.11, 244/212–219
See application file for complete search history.

(56) References Cited

U.S. PATENT DOCUMENTS

| 4,652,917 | A | * | 3/1987 | Miller ......................... 348/135 |
| 5,138,559 | A | * | 8/1992 | Kuehl et al. .................. 702/55 |
| 5,642,293 | A | | 6/1997 | Manthey et al. |
| 6,271,856 | B1 | | 8/2001 | Krishnamurthy |
| 6,574,494 | B1 | | 6/2003 | Van Horn |
| 6,825,936 | B1 | | 11/2004 | Metcalfe et al. |
| 6,826,299 | B1 | | 11/2004 | Brown et al. |

(Continued)

OTHER PUBLICATIONS

Alpheus W. Burner, William A. Lokos, and Danny A. Barrows,"Aeroelastic Deformation: Adaptation of Wind Tunnel Measurement Concepts to Full-Scale Vehicle Flight Testing," NATO AVT-124 Specialists Meeting, Budapest, Hungary, Apr. 2005, p. 9-1-9-17.

(Continued)

Primary Examiner—Matthew Luu
(74) Attorney, Agent, or Firm—Helen M. Galus

(57) ABSTRACT

A method of determining a corrected control surface angle for use in single viewpoint photogrammetry to correct control surface angle measurements affected by wing bending. First and second visual targets are spaced apart from one another on a control surface of an aircraft wing. The targets are positioned at a semispan distance along the aircraft wing. A reference target separation distance is determined using single viewpoint photogrammetry for a "wind off" condition. An apparent target separation distance is then computed for "wind on." The difference between the reference and apparent target separation distances is minimized by re-computing the single viewpoint photogrammetric solution for incrementally changed values of target semispan distances. A final single viewpoint photogrammetric solution is then generated that uses the corrected semispan distance that produced the minimized difference between the reference and apparent target separation distances. The final single viewpoint photogrammetric solution set is used to determine the corrected control surface angle.

9 Claims, 2 Drawing Sheets

U.S. PATENT DOCUMENTS

| | | |
|---|---|---|
| 2002/0136444 A1 | 9/2002 | Brown et al. |
| 2004/0079835 A1* | 4/2004 | Volk ......................... 244/76 C |
| 2004/0114033 A1 | 6/2004 | Eian et al. |
| 2005/0000102 A1 | 1/2005 | Christoph et al. |
| 2005/0133672 A1* | 6/2005 | Irving et al. ................ 244/201 |

OTHER PUBLICATIONS

A.W.Burner and Tianshu Liu, "Videogrammetric Model Deformation Measurement Technique," J. of Aircr., vol. 38 (No. 4), Jul./Aug. 2001, p. 1-31.

* cited by examiner

METHOD FOR CORRECTING CONTROL SURFACE ANGLE MEASUREMENTS IN SINGLE VIEWPOINT PHOTOGRAMMETRY

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to single viewpoint photogrammetry used to measure aircraft or wind tunnel model control surface deformation due to aerodynamic loading. More specifically, the invention is a method of correcting control surface angle measurements affected by wing bending-induced bias errors when using single viewpoint photogrammetry on an aircraft or model experiencing aerodynamic loading.

2. Description of the Related Art

A single-camera/single-view (hereinafter referred to as "single viewpoint") photogrammetric technique is used to measure flow-induced wing twist and control surface deformation. This technique is used in wind tunnel environments for aircraft models and in-flight for actual aircraft. A typical wind tunnel test set-up is illustrated in FIG. 1 where a single camera or other imaging device 10 is positioned at a side wall of 12 of a wind tunnel test area. (For an in-flight, actual aircraft set-up, device 10 would typically be located on the aircraft's fuselage.) Coupled to camera 10 is a processor 11 for implementing single viewpoint photogrammetric computations/solutions in ways already well known in the art. See, for example, "Videogrammetric Model Deformation Measurement Technique," A. W. Burner et al., J. of Aircr., Vol. 38, No. 4, July/August 2001, pp. 745–754, the contents of which are hereby incorporated by reference, as if set forth in their entirety. For in-flight measurements on actual aircraft see, for example, "Aeroelastic Deformation: Adaptation of Wind Tunnel Measurement Concepts to Full-Scale Vehicle Flight Testing," A. W. Burner et al., paper presented at NATO AVT-124 Specialists Meeting, Budapest, Hungary, April, 2005, pp. 9-1 to 9-17.

Camera 10 is focused through a window 12A of wall 12 on a portion (e.g., a wing) of an aircraft or aircraft model 14 positioned in the wind tunnel. Aircraft 14 has a fuselage 16 and wings 18. In evaluating wing twist and control surface deformation, camera 10 would be focused on a wing that has visual targets (not shown) placed thereon.

In FIG. 1, aircraft 14 is viewed from a "head on" viewpoint while camera 10 has a viewpoint from above and to the side of aircraft 14. The wind tunnel's direction of wind flow will be from the "head on" direction. A rectangular X,Y,Z coordinate system is defined and is used when generating the single viewpoint photogrammetric solutions. Typically and for purposes of this description, the following conventions will be applied:

the X-dimension is in the "head on" direction or direction of wind flow, the Y-dimension is perpendicular to the X-dimension and is in the spanwise direction of wings 18, and the Z-dimension is perpendicular to the X and Y-dimensions and, therefore, defines the vertical direction with respect to the camera coordinate system.

As is well known in the art, single viewpoint photogrammetric solution generation requires that one of the three X,Y,Z coordinates must be known so that a set of two equations and two unknowns can be solved. For pitch-sweep wind tunnel testing without aircraft roll, the known coordinate is the Y-coordinate or spanwise locations of the visual targets on the wings. However, target locations change as wind flows over wings 18. That is, as air flows over wings 18, aerodynamic forces act on the wings and tend to cause them to bend (typically upward for rearward swept wings with a positive load) as indicated by dashed lines 20. (Note that the amount of bending has been exaggerated for purposes of illustration.) The resulting Y-shift for visual targets (not shown) used to determine angles on the main wing surface at a given spanwise station are very similar. Thus, the effect of wing bending-induced bias error for visual targets on the main wing element is typically less than 0.1° for the worst case of near the wing tip. However, the differences in Y-shift can be considerable (leading to significant wing bending-induced bias error) for targets on a control surface that is angled with respect to the main wing surface as will now be explained with the aid of FIGS. 2 and 3.

In FIG. 2, aircraft wing 18 is illustrated in cross-section in the X-Z plane with a main wing 18A and a control surface 18B. Control surface 18B is angularly disposed with respect to main wing 18A and, therefore, the direction of wind flow in the X-dimension. Visual targets 22 and 24 are applied to control surface 18B with targets 22 and 24 being separated by a distance "d". Targets 22 and 24 are positioned in the same Y-location for this illustration.

FIG. 3 is a Y-Z plane view of wing 18 and depicts what happens to targets 22 and 24 in the Y-dimension as wing 18 bends during a "wind on" condition. With no wind or "wind off", targets 22 and 24 have the same Y-location as mentioned above. However, with "wind on", control surface 18B along with main wing 18A bends as depicted by dashed line 20. As a result, the Y and Z coordinates of targets 22 and 24 change and are shifted with respect to one another. This condition results in significant error in single viewpoint photogrammetric solutions generated for control surface 18B.

SUMMARY OF THE INVENTION

Accordingly, it is an object of the present invention to provide a method of determining a corrected angle of a control surface during "wind on" conditions in single viewpoint photogrammetry.

Other objects and advantages of the present invention will become more obvious hereinafter in the specification and drawings.

In accordance with the present invention, a method is provided for use in single viewpoint photogrammetry that determines a corrected angle of a control surface during aerodynamic loading. First and second visual targets are spaced apart from one another on a control surface of an aircraft wing where the control surface is angularly disposed with respect to the aircraft wing in a direction of expected wind flow. The targets are positioned at a semispan distance along the aircraft wing. A three dimensional and rectangular X,Y,Z coordinate system is defined with the direction of expected wind flow lying in an X-dimension, the semispan distance lying in a Y-dimension, and a Z-dimension lying perpendicular to the X and Y-dimensions. A reference distance between the targets is determined by generating a single viewpoint photogrammetry solution that uses the semispan distance for a zero wind condition defined by no air movement over the aircraft wing. Next, air is moved in the X-dimension such that, as the air flows over the aircraft wing, the aircraft wing bends through a local spanwise target tilt angle ω measured about the X-dimensions's axis. An apparent distance between the targets is determined as a result of the aircraft wing bending through the angle ω. The apparent distance is obtained by generating a single viewpoint photogrammetry solution using the zero-wind semispan distance. The difference between the reference and apparent distances is minimized by generating a single viewpoint photogrammetry solution using a corrected semispan distance that is equal to the zero-wind semispan distance changed by an incremental amount. A final single viewpoint photogrammetric solution is then generated that uses the corrected semispan distance. The final single viewpoint photogrammetric solution includes a corrected difference $\Delta Z$ between the targets in the Z-dimension and a corrected difference $\Delta X$ between said targets in the X-dimension. The corrected angle is defined by $\tan^{-1}((\Delta Z/\cos \omega)/\Delta X)$.

DETAILED DESCRIPTION OF THE INVENTION

Figure 1:
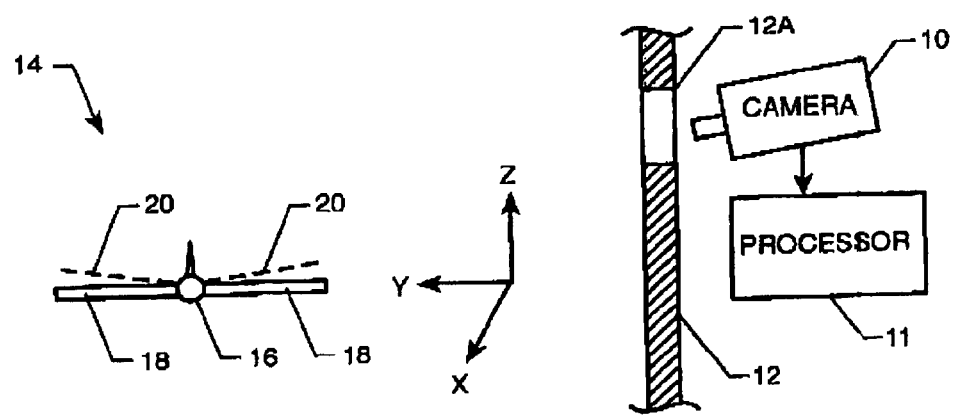
FIG. 1 is a schematic drawing of a single viewpoint photogrammetric set-up.
Figure 2:
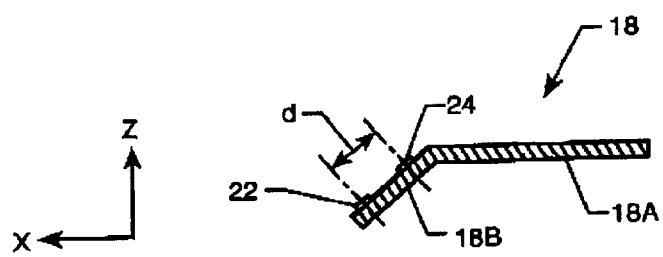
FIG. 2 is a cross-sectional view of an aircraft wing and its control surface having visual targets thereon.

The present invention is a method of correcting wing bending-induced bias error introduced into single viewpoint photogrammetric computations used to determine control surface angular deformation. To explain the method of the present invention, continued reference will be made to FIGS. 1–3 while simultaneously referring to the flow chart in FIG. 4. It will be assumed for this illustration that in a "wind off" condition, targets 22 and 24 on control surface 18B are aligned in the Y-dimension. That is, targets 22 and 24 are located at the same semispan distance from fuselage 16 during "wind off". As used herein, the phrase "wind off" is defined as no wind flowing over aircraft 14 whereas the phrase "wind on" means that there is air moving in the X-dimension over aircraft 14.

The first step (i.e., step 100 in FIG. 4) in the present invention is to utilize camera 10 and processor 11 to generate a single viewpoint photogrammetric solution that includes a measure of the separation distance "d" between targets 22 and 24 at "wind off." Since an actual measurement of separation distance "d" is easily obtained by a variety of conventional means, step 100 can be used to validate the solutions provided by the single viewpoint photogrammetric system defined by camera 10 and processor 11 under "wind off" conditions.

The measurement of separation distance "d" at step 100 is made with aircraft 14 at a pitch angle that aircraft 14 will assume for a "wind on" condition. Additionally, temperature and pressure conditions expected at a "wind on" condition could be duplicated for the "wind off" condition at step 100. As is well known in the art and as mentioned above, single viewpoint photogrammetric solutions require one known coordinate. Accordingly, the solution generated at step 100 is based on the initial "wind off" value of the semispan location of targets 22 and 24 which is also referred to herein as the "wind off" Y-value of targets 22 and 24.

The measurement of separation distance "d" made at step 100 provides a reference measurement of separation distance "d" for the present method. Also, by using the "wind off" single viewpoint photogrammetric solution to obtain the reference measurement of separation distance "d", any bias errors associated with the particular system of camera 10/processor 11 will also be present for a "wind on" condition and, therefore, tend to cancel.

Figure 3:
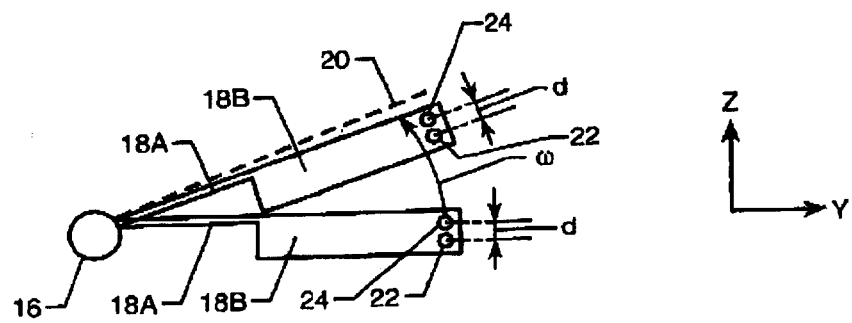
FIG. 3 is a head on view of the aircraft wing and its control surface depicting target locations during "wind off" and "wind on" conditions.
Figure 4:
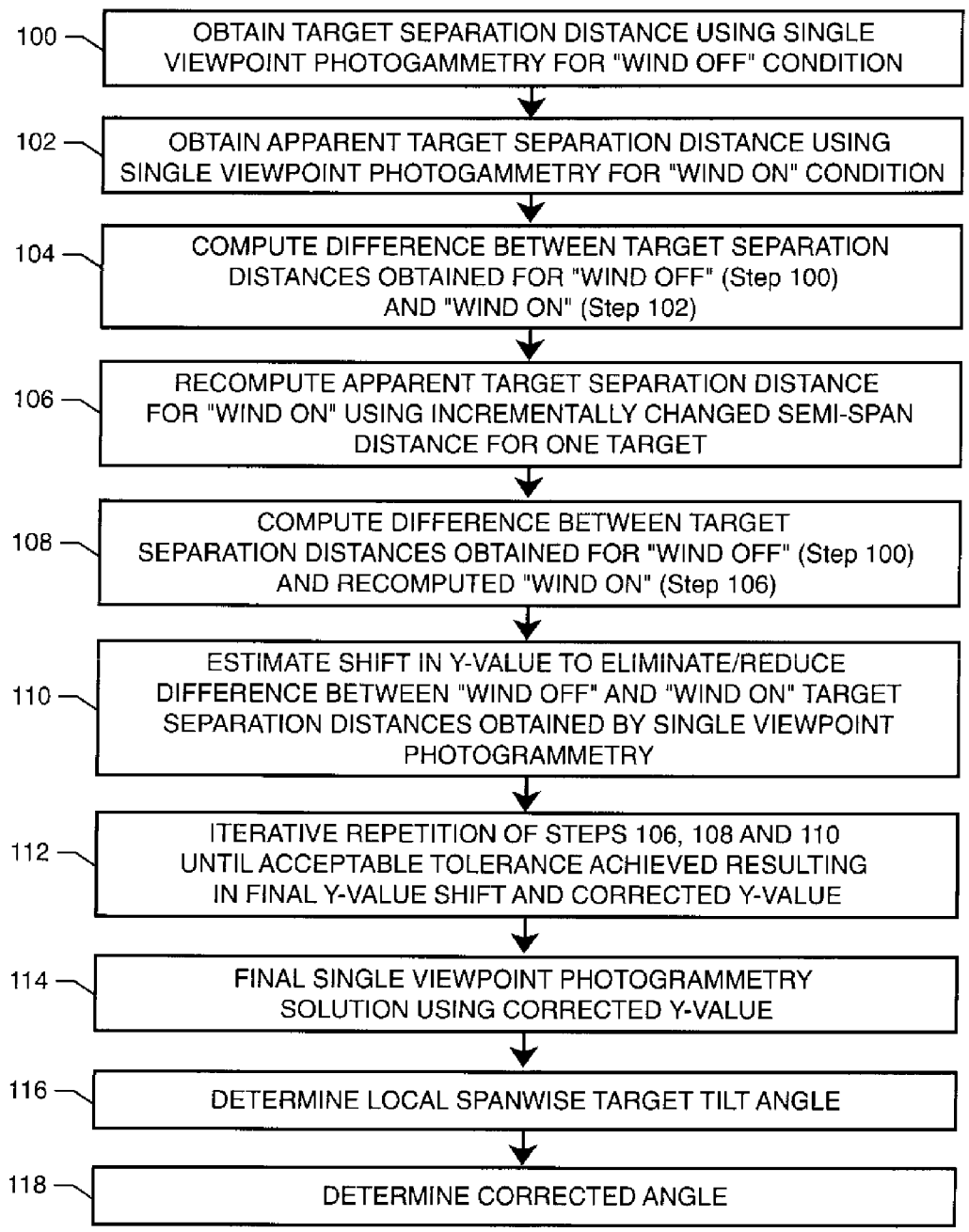
FIG. 4 is a flow chart of the method steps implemented in accordance with the present invention.

Next, at step 102, separation distance "d" is computed for a "wind on" condition defined as wind moving along the X-dimension and over aircraft 14. The known coordinate used to generate the solution at step 102 is again the initial "wind off" Y-value of targets 22 and 24. However, as illustrated in FIG. 3, wing bending due to the "wind on" condition shifts targets 22 and 24 in both the Y and Z dimensions. Since the original uncorrected single viewpoint photogrammetry solution does not account for the shift in Y, bias error is introduced into the solution of X and Z. Accordingly, the separation distance "d" apparent to camera 10/processor 11 and obtained as a result of step 102 may be in error and different than the reference measurement obtained at step 100. At step 104, a difference is computed between the separation distances "d" obtained at steps 100 and 102.

The next step in the present invention (i.e., step 106) involves the re-computation of the apparent "wind on" separation distance "d" using (i) the initial Y-value for one of targets 22 and 24, and (ii) an incremented Y-value for the other of targets 22 and 24. The incremented Y-value in step 106 is the original "wind off" Y-value changed by a small initial increment. The actual initial increment is simply a reasonably small increment (e.g., 0.01 inch). At step 108, a difference is computed between the separation distances "d" obtained at steps 100 and 106.

The goal of step 110 is to estimate the shift in the Y-value needed at "wind on" to eliminate any difference between the "wind off" target separation distance and the "wind on" target separation distance obtained using single viewpoint photogrammetry. This is accomplished by noting the change in Y-value corresponding to the target separation differences computed in steps 104 and 108. Specifically, the intercept defined by $\Delta Y$ (on the vertical axis) versus $\Delta d$ (on the horizontal axis) is determined using linear extrapolation. The intercept is the next (closer) estimate of the increment in Y-value needed to minimize the difference between the "wind off" and "wind on" target separation distances obtained by single viewpoint photogrammetry.

In order to eliminate (or reduce with an acceptable tolerance level) any difference between the "wind off" and "wind on" target separation distances obtained by single viewpoint photogrammetry, it may be necessary to repeat steps 106, 108 and 110. Accordingly, step 112 provides for the iterative repetition of these steps. Once the above-described difference in target separation distance is eliminated or acceptably reduced, the final Y-value shift is used to define a corrected Y-value indicative of the Y-dimension location of targets 22 and 24 during "wind on".

At step 114, a final single viewpoint photogrammetric solution is generated using the corrected Y-value. Part of the solution set includes the X and Z coordinates of targets 22 and 24 during "wind on" with the difference in the X coordinates between targets 22 and 24 being defined as $\Delta X$, and the difference in the Z coordinates between targets 22 and 24 being defined as $\Delta Z$.

Before the ultimate determination of the present invention's corrected angle is made, step 116 determines an angular measure of the amount of target tilt in the Y-Z plane about the X-axis. This angular measure is illustrated in FIG. 3 as angle $\omega$ and is defined herein as a local spanwise target tilt angle. Angle $\omega$ is the angle that targets 22 and 24 rotate through in the Y-Z plane as a result of wing bending during aerodynamic loading. Angle $\omega$ is computed by taking the negative arctangent of the slope of Y-values versus the single viewpoint photogrammetry-computed Z-values of the targets. The negative sign of the arctangent is used to maintain the common counter-clockwise positive sign convention often used for Euler angles.

The final step in the present invention uses the corrected Y-value solution set from step 114 to determine a final corrected angle of control surface 18B for a "wind on" condition. Specifically, the final corrected angle determined at step 118 is defined as $\tan^{-1}((\Delta Z/\cos \omega)/\Delta X)$, where $\Delta X$ and $\Delta Z$ are the X and Z coordinate differences, respectively, for targets 22 and 24 determined by the final single viewpoint photogrammetric solution at step 114. The scaling of $\Delta Z$ by the inverse of the cosine of the angle $\omega$ accounts for the tilt of control surface 18B in the Y-Z plane as wing bending occurs.

The advantages of the present invention are numerous. The technique is not dependent on the functional form of wing bending and the inboard location of zero bending is not required as it is for existing techniques. The new innovation is based on differential computations between "wind off" and "wind on" conditions which tends to reduce residual bias errors present for both "wind off" and "wind on" conditions.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of determining a corrected control surface angle for use in single viewpoint photogrammetry to correct control surface angle measurements affected by wing bending, comprising the steps of:

providing first and second visual targets spaced apart from one another on a control surface of an aircraft wing wherein the control surface is angularly disposed with respect to the aircraft wing in a direction of expected wind flow, said first and second visual targets positioned at a semispan distance along the aircraft wing, wherein a three dimensional and rectangular X,Y,Z coordinate system is defined with said direction of expected wind flow lying in an X-dimension, said semispan distance lying in a Y-dimension, and a Z-dimension lying perpendicular to said X-dimension and said Y-dimension;

determining a reference distance between said first and second visual targets by generating a single viewpoint photogrammetry solution using said semispan distance for a zero wind condition defined by no air movement over the aircraft wing;

determining an apparent distance between said first and second visual targets by generating a single viewpoint photogrammetry solution using said semispan distance for a wind condition defined by air movement over the aircraft wing;

recalculating said apparent distance between said first and second visual targets by generating a single viewpoint photogrammetry solution using an estimated semispan distance for said wind condition for one of said first and second visual targets, said estimated semispan distance defined as said semispan distance changed by an incremental amount;

iteratively repeating said step of recalculating for different values of said estimated semispan distance until said apparent distance is approximately equal to said reference distance as defined by an acceptable tolerance therebetween wherein a final apparent distance is thereby defined, and wherein said estimated semispan distance associated with said final apparent distance defines a corrected semispan distance;

generating a final single viewpoint photogrammetric solution using said corrected semispan distance for said wind condition, said final single viewpoint photogrammetric solution including a difference $\Delta Z$ between said first and second visual targets in said Z-dimension and a difference $\Delta X$ between said first and second visual targets in said X-dimension; and determining a tilt angle of rotation $\omega$ that said first and second visual targets rotate through as the aircraft wing bends during said wind condition, said tilt angle $\omega$ lying in a plane defined by said Y-dimension and said Z-dimension, wherein a corrected control surface angle is defined by $\tan^{-1}((\Delta Z/\cos \omega)/\Delta X)$.

2. A method according to claim 1 further comprising the step of validating said reference distance using an actual measured distance between said first and second visual targets.

3. A method according to claim 1 wherein said wind condition is created by the step of generating a flow of air in said X-dimension.

4. A method according to claim 1 further comprising the step of keeping the aircraft wing at the same pitch angle for said zero condition and for said wind condition.

5. A method according to claim 1 further comprising the step of keeping pressure and temperature the same in the vicinity of the aircraft wing for said zero condition and for said wind condition.

6. A method of determining a corrected control surface angle for use in single viewpoint photogrammetry to correct control surface angle measurements affected by wing bending, comprising the steps of:

providing first and second visual targets spaced apart from one another on a control surface of an aircraft wing wherein the control surface is angularly disposed with respect to the aircraft wing in a direction of expected wind flow, said first and second visual targets positioned at a semispan distance along the aircraft wing, wherein a three dimensional and rectangular X,Y,Z coordinate system is defined with said direction of expected wind flow lying in an X-dimension, said semispan distance lying in a Y-dimension, and a Z-dimension lying perpendicular to said X-dimension and said Y-dimension;

determining a reference distance between said first and second visual targets by generating a single viewpoint photogrammetry solution that uses said semispan distance for a zero wind condition defined by no air movement over the aircraft wing;

moving air in said X-dimension wherein, as said air flows over the aircraft wing, the aircraft wing bends such that said first and second visual targets experience an angular tilt about an X-axis in said X-dimension that is defined by an angle ω relative to said X-axis;

determining an apparent distance between said first and second visual targets as a result of said first and second visual targets experiencing said angular tilt, said apparent distance obtained by generating a single viewpoint photogrammetry solution using said semispan distance as said air flows over the aircraft wing;

minimizing a difference between said reference distance and said apparent distance by generating a single viewpoint photogrammetry solution using a corrected semispan distance that is equal to said semispan distance changed by an incremental amount; and generating a final single viewpoint photogrammetric solution that uses said corrected semispan distance for which said difference is minimized, said final single viewpoint photogrammetric solution including a difference $\Delta Z$ between said first and second visual targets in said Z-dimension and a difference $\Delta X$ between said first and second visual targets in said X-dimension, wherein a corrected control surface angle is defined by $\tan^{-1}((\Delta Z/\cos \omega)/\Delta X)$.

7. A method according to claim 6 further comprising the step of validating said reference distance using an actual measured distance between said first and second visual targets.

8. A method according to claim 6 further comprising the step of keeping the aircraft wing at the same pitch angle for said zero condition and during said step of moving.

9. A method according to claim 6 further comprising the step of keeping pressure and temperature the same in the vicinity of the aircraft wing for said zero condition and during said step of moving.

* * * * *